United States Patent
Casamassima et al.

(10) Patent No.: US 11,941,963 B2
(45) Date of Patent: *Mar. 26, 2024

(54) SYSTEM AND METHOD FOR FACILITATING DETECTING AN UNAUTHORIZED ACCESS TO AN OBJECT

(71) Applicant: NXP B.V., Eindhoven (NL)

(72) Inventors: Filippo Casamassima, Thal (AT); Wolfgang Eber, Graz (AT)

(73) Assignee: NXP B.V., Eindhoven (NL)

( * ) Notice: Subject to any disclaimer, the term of this patent is extended or adjusted under 35 U.S.C. 154(b) by 17 days.

This patent is subject to a terminal disclaimer.

(21) Appl. No.: 17/705,468

(22) Filed: Mar. 28, 2022

(65) Prior Publication Data

US 2022/0383716 A1 Dec. 1, 2022

(30) Foreign Application Priority Data

May 27, 2021 (EP) .................................... 21176376

(51) Int. Cl.
*G08B 13/22* (2006.01)
*H04B 1/7163* (2011.01)
*H04L 25/02* (2006.01)

(52) U.S. Cl.
CPC ........... *G08B 13/22* (2013.01); *H04B 1/7163* (2013.01); *H04L 25/0212* (2013.01)

(58) Field of Classification Search
CPC . G08B 13/181; H04L 25/0212; H04B 1/7163; G01S 13/0209; G01S 13/06; G01S 7/415; G01S 13/04

See application file for complete search history.

(56) References Cited

U.S. PATENT DOCUMENTS

| 8,461,989 B2 | 6/2013 | Romero et al. |
| 2014/0093021 A1* | 4/2014 | Jain ........................ H04L 25/023 375/346 |
| 2020/0174110 A1 | 6/2020 | Carlson et al. |
| 2020/0348406 A1* | 11/2020 | Jain ......................... G05D 1/028 |

(Continued)

FOREIGN PATENT DOCUMENTS

CN 109246691 A 11/2018

*Primary Examiner* — Mirza F Alam (57) ABSTRACT

In accordance with a first aspect of the present disclosure, a system is provided for facilitating detecting an unauthorized access to an object, the system comprising: a plurality of ultra-wideband (UWB) communication nodes; a controller operatively coupled to said plurality of UWB communication nodes, wherein the controller is configured to: cause at least one of the UWB communication nodes to transmit one or more UWB messages to other UWB communication nodes of said plurality of UWB communication nodes; receive a channel impulse response (CIR) estimate and/or one or more parameters relating to said CIR output by the UWB communication nodes in response to receiving said UWB messages; analyze said CIR estimate and/or said parameters relating to the CIR to detect said unauthorized access to the object. In accordance with a second aspect of the present disclosure, a corresponding method is conceived for facilitating detecting an unauthorized access to an object. In accordance with a third aspect of the present disclosure, a computer program is provided for carrying out said method.

11 Claims, 8 Drawing Sheets

(56) References Cited

U.S. PATENT DOCUMENTS

| | | | |
|---|---|---|---|
| 2021/0190702 A1* | 6/2021 | Wu | G01S 7/411 |
| 2021/0190940 A1* | 6/2021 | Troutman | G01S 13/72 |
| 2022/0171046 A1* | 6/2022 | Zeng | G01S 13/04 |

* cited by examiner

SYSTEM AND METHOD FOR FACILITATING DETECTING AN UNAUTHORIZED ACCESS TO AN OBJECT

This application claims priority from patent application numbered EP21176376.8 filed in the European Patent Office on May 27, 2021, all of which is incorporated by reference in its entirety.

TECHNICAL FIELD

The present disclosure relates to a system for facilitating detecting an unauthorized access to an object. Furthermore, the present disclosure relates to a corresponding method for facilitating detecting an unauthorized access to an object, and to a computer program for carrying out said method.

BACKGROUND

The access to valuable objects, such as vehicles, should be limited to authorized users. However, successful attempts may be made to access such objects, while the persons making those attempts may not be authorized to access them. Thus, it is important to detect the unauthorized access to valuable objects, such as vehicles. Another example of a valuable object of the kind set forth is a building or a space within a building, such as a room.

SUMMARY

In accordance with a first aspect of the present disclosure, a system is provided for facilitating detecting an unauthorized access to an object, the system comprising: a plurality of ultra-wideband (UWB) communication nodes; a controller operatively coupled to said plurality of UWB communication nodes, wherein the controller is configured to: cause at least one of the UWB communication nodes to transmit one or more UWB messages to other UWB communication nodes of said plurality of UWB communication nodes; receive a channel impulse response (CIR) estimate and/or one or more parameters relating to said CIR output by the UWB communication nodes in response to receiving said UWB messages; analyze said CIR estimate and/or said parameters relating to the CIR to detect said unauthorized access to the object.

In one or more embodiments, the controller is configured to determine changes of the CIR estimate and/or of the parameters relating to the CIR, and to detect said unauthorized access by comparing the determined changes with predefined values and concluding that unauthorized access has occurred if the determined changes match with said predefined values within a given tolerance range.

In one or more embodiments, the controller is configured to cause different UWB communication nodes of said plurality of UWB communication nodes to transmit said UWB messages.

In one or more embodiments, the controller is configured to analyze said CIR estimate and/or said parameters relating to the CIR using a machine learning algorithm.

In one or more embodiments, the machine learning algorithm is a decision tree algorithm, a neural network, a nearest neighbor algorithm, or a support vector machine.

In one or more embodiments, the controller is further configured to feed the machine learning algorithm with data indicative of an environment in which the object is located.

In one or more embodiments, the controller is configured to cause said at least at least one of the UWB communication nodes to transmit said UWB messages after the object has been locked.

In one or more embodiments, the controller is further configured to execute one or more predefined operations in response to detecting the unauthorized access to the object.

In one or more embodiments, the predefined operations comprise raising an alarm and/or activating one or more intrusion sensors.

In one or more embodiments, the parameters relating to the CIR include at least one of the following parameters: a power level; a strongest path amplitude ratio; a strongest path time difference; a spectral power; a first path width; a first path prominence.

In one or more embodiments, the object is a vehicle, and the UWB communication nodes are UWB anchors comprised in or attached to said vehicle.

In accordance with a second aspect of the present disclosure, a method is conceived for facilitating detecting an unauthorized access to an object, the method comprising: causing, by a controller, at least one of a plurality of UWB communication nodes to transmit one or more UWB messages to other UWB communication nodes of said plurality of UWB communication nodes; receiving, by the controller, a channel impulse response (CIR) estimate and/or one or more parameters relating to said CIR output by the UWB communication nodes in response to receiving said UWB messages; analyzing, by the controller, said CIR estimate and/or said parameters relating to the CIR to detect said unauthorized access to the object.

In one or more embodiments, the controller determines changes of the CIR estimate and/or of the parameters relating to the CIR, and detects said unauthorized access by comparing the determined changes with predefined values and concluding that unauthorized access has occurred if the determined changes match with said predefined values within a given tolerance range.

In one or more embodiments, the controller causes different UWB communication nodes of said plurality of UWB communication nodes to transmit said UWB messages.

In accordance with a third aspect of the present disclosure, a computer program is provided, comprising executable instructions which, when executed by a controller, cause said controller to carry out a method of the kind set forth.

DESCRIPTION OF DRAWINGS

Embodiments will be described in more detail with reference to the appended drawings, in which.

DESCRIPTION OF EMBODIMENTS

As mentioned above, the access to valuable objects, such as vehicles, should be limited to authorized users. However, successful attempts may be made to access such objects, while the persons making those attempts may not be authorized to access them. Thus, it is important to detect the unauthorized access to valuable objects, such as vehicles. For instance, smart vehicle access systems may allow a secure keyless access to a vehicle, using a smart phone or another device. These access systems are often based on ultra-wideband (UWB) technology. However, a smart vehicle access system does not prevent unauthorized intrusion to the vehicle or vehicle theft (e.g., through mechanical attacks). It is therefore important that unauthorized intrusions to an object can be detected. Another example of a valuable object of the kind set forth is a building or a space within a building, such as a room.

Ultra-wideband (UWB) is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices.

UWB technology—also referred to as impulse-radio ultra-wideband (IR-UWB)—is a RF communication technology that uses pulses having a short duration for data communication. An important feature of IR-UWB technology is that it can be used for secure and accurate distance measurements between two or more devices. Typical distance measurement methods are the so-called single-sided two-way ranging (SS-TWR) method and the double-sided two-way ranging (DS-TWR) method.

Because UWB technology has an accurate distance measurement capability, it may be used to advantage in access systems in which the position of devices should be determined to enable access to an object. For instance, a vehicle access system may comprise a user's smart device (e.g., key fob) and another smart device (e.g., an anchor embedded in the vehicle). To enable access to the vehicle, the user's smart device must have a predefined range, velocity, and/or angle relative to the other smart device. In order to measure these parameters, UWB transceivers may operate in different modes of operation, such as a ranging mode, an angle-of-arrival (AoA) mode and a radar mode. In another example, UWB technology may be used for accessing a building or a predefined space within a building.

In the ranging mode of operation, frames will typically be exchanged between two devices via at least one antenna on each device, and at least a SS-TWR operation will be carried out (which may also be referred to as a ping-pong operation). In particular, channel impulse responses (CIRs) are estimated on both devices, timestamps will be generated based on the CIRs on both devices, and those timestamps are exchanged. Then, a time of flight (ToF) is calculated based on the timestamps and a range (i.e., a distance) is calculated based on the ToF. Alternatively, a DS-TWR operation may be carried out (which may also be referred to as a ping-pong-ping operation). The AoA mode of operation is similar to the ranging mode, but it involves at least two antennas on one device. In particular, in the AoA mode of operation, two phase values associated with at least two CIRs are calculated on one device. Then, a phase difference of arrival (PDoA) is calculated based on the two phase values, and an AoA is calculated based on the PDoA. In the radar mode of operation, frames are transmitted by at least one device and those frames are received by the same device and/or by one or more other devices. Then, the CIRs are estimated on the device or devices receiving the frames, and the range and/or velocity and/or AoA are calculated based on the estimated CIRs. The skilled person will appreciate that these are non-limiting examples of how the different modes of operation can be implemented. In other words, the modes may be implemented differently, depending on the requirements imposed by the application, for example.

Accordingly, smart vehicle access systems may employ UWB technology to enable access to a vehicle, in particular by facilitating ranging operations between a key fob and one or more UWB anchors in the vehicle. In addition, some existing intrusion detection systems are based on UWB-based radar technology. However, these systems consume a relatively large amount of power. It is noted that UWB-based radar technology requires, even if duty cycling is applied, several frames to detect intrusion and, in addition, complex signal processing algorithms.

Now discussed are a system and a method for facilitating detecting an unauthorized access to an object, in which a relatively low amount of power is consumed to detect said unauthorized access.

Figure 1:
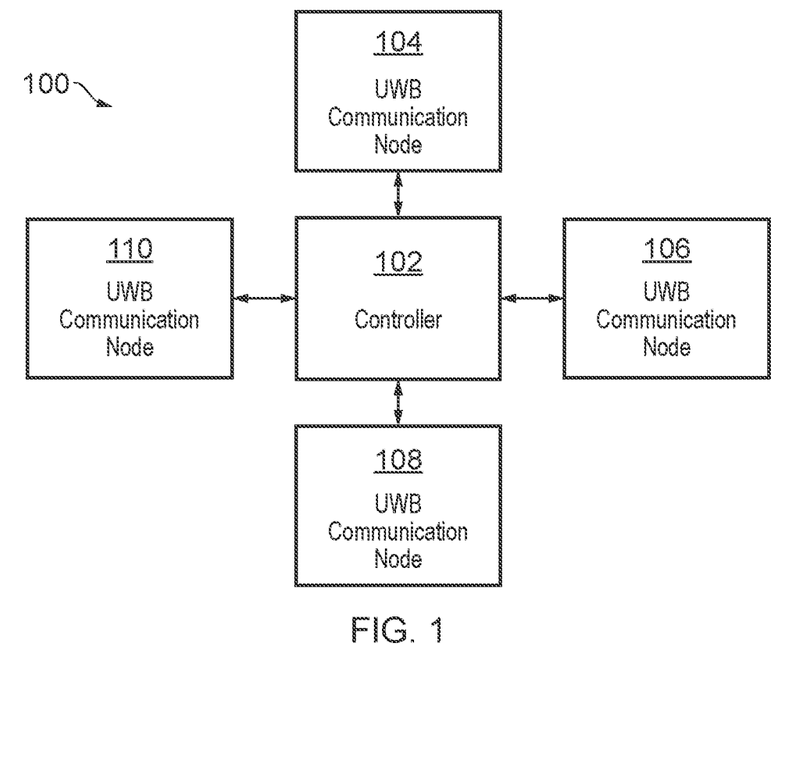
FIG. 1 shows an illustrative embodiment of a system for facilitating detecting an unauthorized access to an object.

FIG. 1 shows an illustrative embodiment of a system 100 for facilitating detecting an unauthorized access to an object. The system 100 comprises a controller 102 and a plurality of UWB communication nodes 104, 106, 108, 110. The controller 102 is configured to cause at least one of the UWB communication nodes 104, 106, 108, 110 to transmit one or more UWB messages to other UWB communication nodes of said plurality of UWB communication nodes 104, 106, 108, 110. For instance, the controller 102 may be send an instruction or command to the at least one of the UWB communication nodes 104, 106, 108, 110, which triggers said communication node or nodes to transmit the UWB messages. Furthermore, the controller 102 is configured to receive a channel impulse response (CIR) estimate and/or one or more parameters relating to said CIR output by the UWB communication nodes 104, 106, 108, 110 in response to receiving said UWB messages. Furthermore, the controller 102 is configured to analyze the CIR estimate and/or the parameters relating to the CIR to detect the unauthorized access to the object. In this way, the detection of the unauthorized access is facilitated, without consuming a large amount of power.

In particular, the UWB communication nodes already present in an object or attached thereto for the purpose of enabling or granting access to the object, may be reused to detect an intrusion to the object. These UWB communication nodes are often referred to as anchors. For instance, in a practical implementation, the object is a vehicle, and the UWB communication nodes are UWB anchors comprised in or attached to said vehicle. When the vehicle is parked, the UWB anchors can be used to exchange messages. This will allow to estimate the channel impulse response (CIR) and to derive parameters from the CIR. The inventors have recognized that by analyzing this CIR and/or the parameters derived from the CIR, the aforementioned intrusion can easily be detected, while the power consumption of the system remains at an acceptable level. Accordingly, the existing UWB infrastructure in the vehicle may be re-used, by extending its purposes to intrusion detection. Compared to intrusion detection techniques based on UWB-based radar, the power consumption and the computation effort are low. Furthermore, the use of anchor-to-anchor ranging may also increase the awareness of the environment around the vehicle, such that the results of the analysis may be used to improve the localization algorithms. In addition, information about the type of intrusion may be derived from the CIR and/or the parameters relating to the CIR (e.g., door opened, person inside, broken window). Furthermore, the CIR and/or the parameters relating to the CIR may provide an indication that one or more of the UWB anchors are being manipulated.

In one or more embodiments, the controller is configured to determine changes of the CIR estimate and/or of the parameters relating to the CIR, and to detect said unauthorized access by comparing the determined changes with predefined values and concluding that unauthorized access has occurred if the determined changes match with said predefined values within a given tolerance range. In this way, the detection of the unauthorized access is further facilitated. In one or more embodiments, the controller is configured to cause different UWB communication nodes of said plurality of UWB communication nodes to transmit said UWB messages. In this way, the detection of the unauthorized access is further facilitated. For example, by periodically changing the UWB communication node or nodes that transmit the messages, more intrusions may be detected. More specifically, it is possible that an intrusion is not be detected if a given UWB communication node transmits the messages, while it might be detected if another UWB communication node transmits the messages.

In one or more embodiments, the controller is configured to analyze said CIR estimate and/or said parameters relating to the CIR using a machine learning algorithm. In this way, the analysis of the estimated CIR and the parameters relating thereto is facilitated. This, in turn, further facilitates the detection of an intrusion. In a practical implementation, the machine learning algorithm is a decision tree algorithm, a neural network, a nearest neighbor algorithm, or a support vector machine. In one or more embodiments, the controller is further configured to feed the machine learning algorithm with data indicative of an environment in which the object is located. In this way, the analysis of the estimated CIR and/or the parameters relating thereto may be optimized, in the sense that the environment of the object may be taken into account. In one or more embodiments, the controller is configured to cause said at least at least one of the UWB communication nodes to transmit said UWB messages after the object has been locked. In this way, the system may be activated only at the appropriate time, which further reduces its power consumption.

In one or more embodiments, the controller is further configured to execute one or more predefined operations in response to detecting the unauthorized access to the object. In this way, the system may react in an appropriate way to a detected intrusion. In a practical implementation, the predefined operations comprise raising an alarm and/or activating one or more intrusion sensors. By raising an alarm, the intrusion may be brought to the attention of the owner of the object and/or to the attention of the authorities, for example. Furthermore, by activating one or more other intrusion sensors, the detected intrusion may be verified, for instance to avoid false alarms. In one or more embodiments, the parameters relating to the CIR include at least one of the following parameters: a power level, a strongest path amplitude ratio, a strongest path time difference, a spectral power, a first path width, and a first path prominence. These parameters are particularly suitable for the purpose of detecting intrusions.

More specifically, the parameters may be calculated from the CIR. In a simplified representation, the CIR has a peak every time there was a reflection in the signal. The first peak is thus the so-called first path (i.e., the shortest path the RF signal could travel from the transmitter to the responder). It is noted that there can be another peak corresponding to a reflection in the CIR. In that case, if the first path (FP) is attenuated a reflection can be stronger, thus the strongest path can arrive later than the first path. Accordingly, the strongest path amplitude ratio is the ratio between the strongest path and the first path. Furthermore, strongest path time difference is the time (or distance) difference between the first path and the strongest path. In other words, the strongest path time difference may be the period that elapses between the moment the first path and the strongest path arrive at the receiver. Furthermore, the spectral power is the Fast Fourier Transform (FFT) of the CIR. Furthermore, the FP width is the width of the first path peak, as is shown for example in FIG. 5A.

Figure 2:
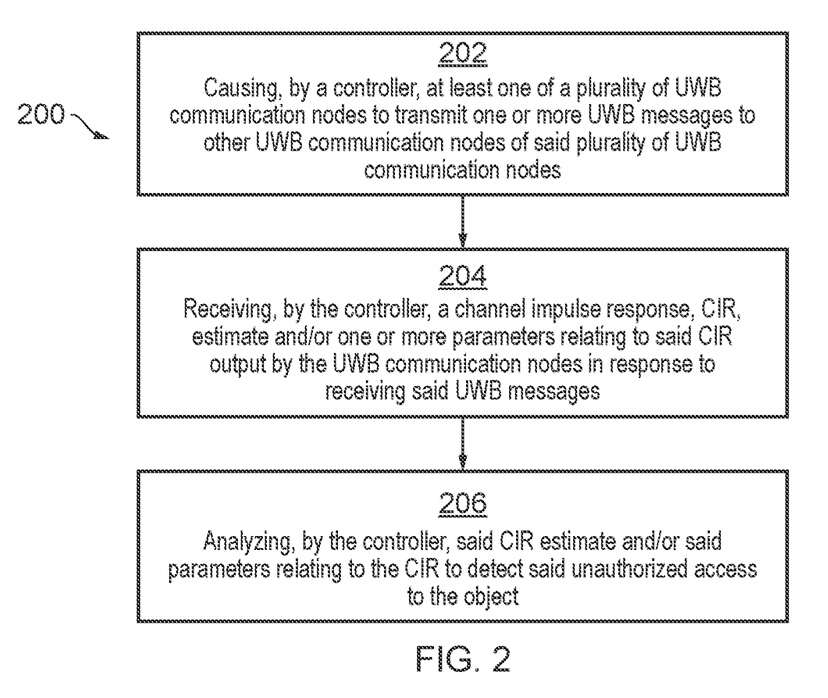
FIG. 2 shows an illustrative embodiment of a method for facilitating detecting an unauthorized access to an object.

FIG. 2 shows an illustrative embodiment of a method 200 for facilitating detecting an unauthorized access to an object. The method 200 comprises the following steps. At 202, a controller causes at least one of a plurality of UWB communication nodes to transmit one or more UWB messages to other UWB communication nodes of said plurality of UWB communication nodes. Furthermore, at 204, the controller receives a CIR estimate and/or one or more parameters relating to said CIR output by the UWB communication nodes in response to receiving said UWB messages. Furthermore, at 206, the controller analyzes the CIR estimate and/or the parameters relating to the CIR to detect the unauthorized access to the object. As mentioned above, in this way, the detection of the unauthorized access is facilitated, without consuming a large amount of power.

Figure 3:
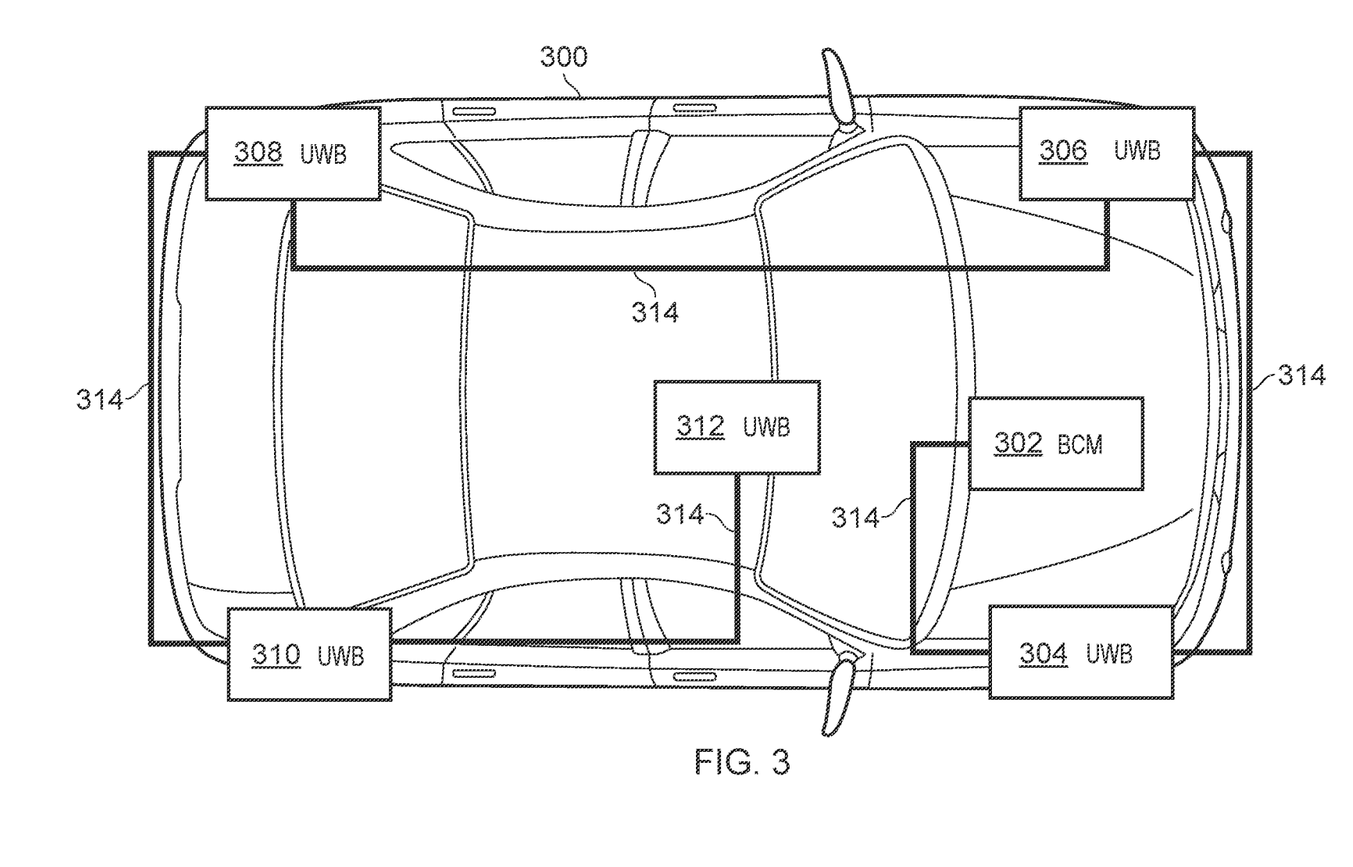
FIG. 3 shows an illustrative embodiment of a vehicle.

FIG. 3 shows an illustrative embodiment of a vehicle 300. The vehicle 300 comprises a system for facilitating the detection of an unauthorized access of the kind set forth. The system includes a controller of the kind set forth, which is implemented as a body control module (BCM) 302. Furthermore, the system comprises a plurality of UWB communication nodes of the kind set forth, which are implemented as UWB anchors 304, 306, 308, 310, 312. The body control module (BCM) 302 is operatively coupled to the UWB anchors 304, 306, 308, 310, 312 through a network 314, which may be implemented as a controller area network (CAN).

More specifically, the UWB anchors 304, 306, 308, 310, 312 are connected to a central unit, i.e. the BCM 302, which is capable of controlling ranging operations and reading the results of said ranging operations. Each UWB anchor may be able to send and receive UWB messages and to output an estimate of the CIR resulting from the transmission and reception of the UWB messages. Alternatively, or in addition, the UWB anchors 304, 306, 308, 310, 312 may be able to calculate parameters relating to the CIR, which may be provided to the BCM 302. It is noted that a typical architecture for car access applications uses four outside anchors (located at the corners of the car) and multiple inside anchors, for example three in the car cabin and one in the trunk area.

Figure 4:
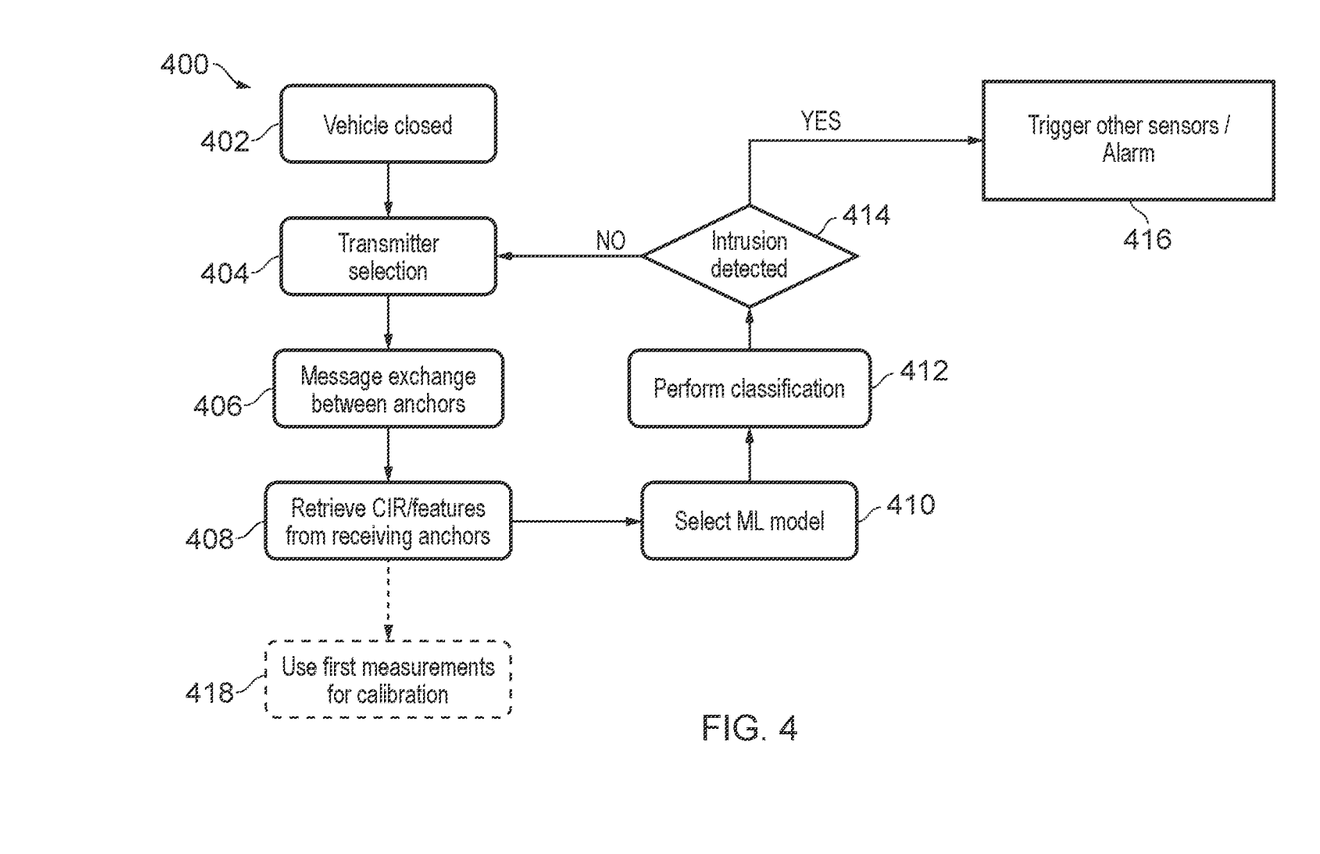
FIG. 4 shows another illustrative embodiment of a method for facilitating detecting an unauthorized access to an object.

FIG. 4 shows another illustrative embodiment of a method 400 for facilitating detecting an unauthorized access to an object. When the BCM receives the information that the vehicle is locked 402, it periodically commands 404 UWB anchors to send and receive messages 406. The most efficient way is that one anchor transmits, and all the other anchors receive the message. It is noted that the transmitting anchor does not have to remain the same. In other words, the transmitting anchor can be changed after every message exchange or after a predefined number of message exchanges. The BCM can then retrieve the results 408 from the anchors that receive the messages (i.e., the estimated CIR or the calculated parameters relating thereto, which may be referred to as features) and select a machine learning algorithm 410 to detect a change in the environment by performing a classification 412 of the results retrieved from the anchors. It is noted that the estimated CIR is indicative of reflective or absorbing objects in close proximity of the vehicle. Therefore, an intrusion may easily be detected. Once the machine learning algorithm detects 414 the presence of a human, or any other preconfigured event which is interpreted as an intrusion, it may trigger 416 other intrusion sensors, or directly the vehicle alarm.

Optionally, the first measurements may be used for calibration purposes 418. In particular, the moments after the door closure may be used to feed the machine learning algorithm with new data and information about the environment where the vehicle is parked. In this case only a few environments can be used (e.g., open/underground parking lot, garage, driveway) to choose the proper machine learning algorithm (i.e. machine learning model). In particular, the environment may affect the shape of the CIR, although the effect is not always significant. For example, the difference in CIR between an empty parking lot and a medium density parking lot is not so high, and the same machine learning model can be used to detect intrusion. On the other side, the difference between the CIR measured in a garage and the CIR measured in a parking lot is significantly different. In that case, different machine learning models should be used, and the vehicle should know which model to use.

Since there are typically multiple anchors inside a vehicle the presently disclosed methods may be applied to inside-to-inside anchors as well. More specifically, changes in the vehicle's interior resulting from an intrusion will change the channel due to a changed absorption and reflection behavior, which may be detected. Furthermore, changes inside the vehicle's cabin may be detected after the doors have been closed and the vehicle has been locked, in order to identify various situations (e.g., an object on the rear seat). Furthermore, the sequence of operations shown in FIG. 4 may be repeated with a fixed or variable interval, based on the energy budget and the results of a previous classification. For example, the sequence may be repeated every second under normal conditions, but it may be repeated at a higher frequency in case a previous result indicated the presence of a person next to the vehicle.

Figure 5A:
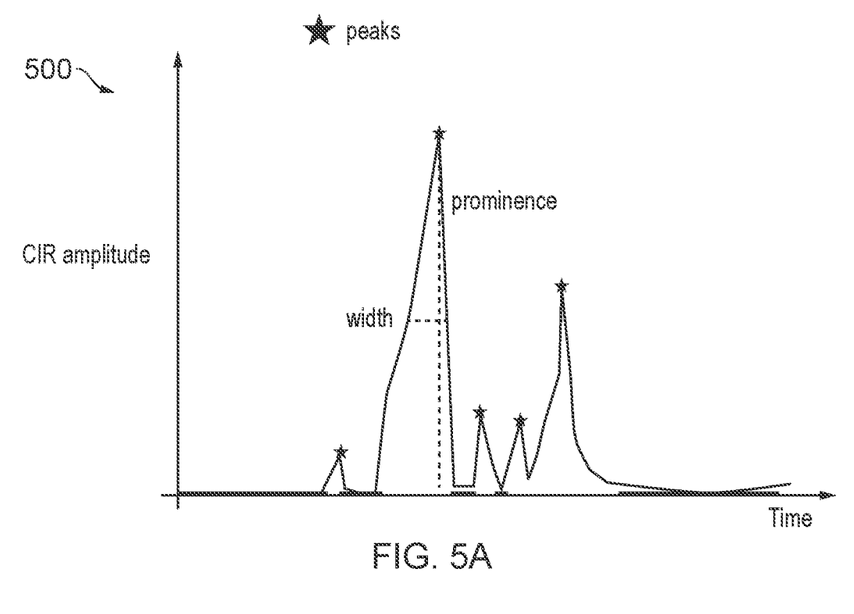
FIG. 5A shows an illustrative embodiment of first path features.

FIG. 5A shows an illustrative embodiment of first path features 500. As mentioned above, the parameters relating to the CIR (also referred to as features of the CIR) may include at least one of the following parameters: a power level, a strongest path amplitude ratio, a strongest path time difference, a spectral power, a first path width, and a first path prominence. FIG. 5A shows examples of such features, i.e. the width and the prominence of the first path. These features may be used by the machine learning algorithm to take a decision on the possible intrusion. It is noted that the first path may be defined as the first peak in the CIR above the noise level. If the CIR is represented with the amplitude on Y-axis and the time on the X axis (or the distance since the speed of the RF signal is known), the width is the amplitude at half the height of the first path peak. Furthermore, the prominence is the difference between the peak and the valley, as shown in FIG. 5A.

Figure 5B:
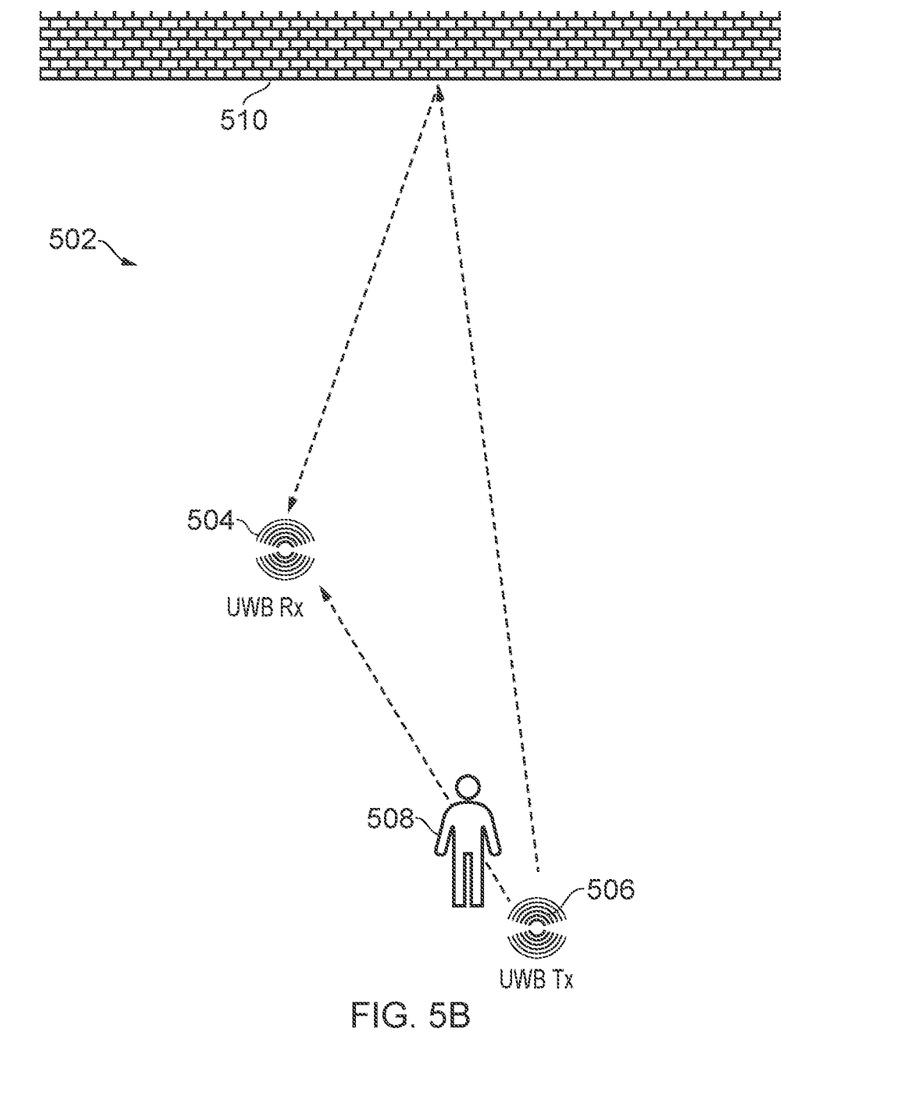
FIG. 5B shows an illustrative embodiment of a UWB signal transmission.

FIG. 5B shows an illustrative embodiment of a UWB signal transmission 502 in which a UWB transmitter 506 sends a signal to a UWB receiver 504. A human body 508 is located between the UWB transmitter 506 and the UWB receiver 504. Furthermore, the signal is reflected by a wall 510.

Figure 5C:
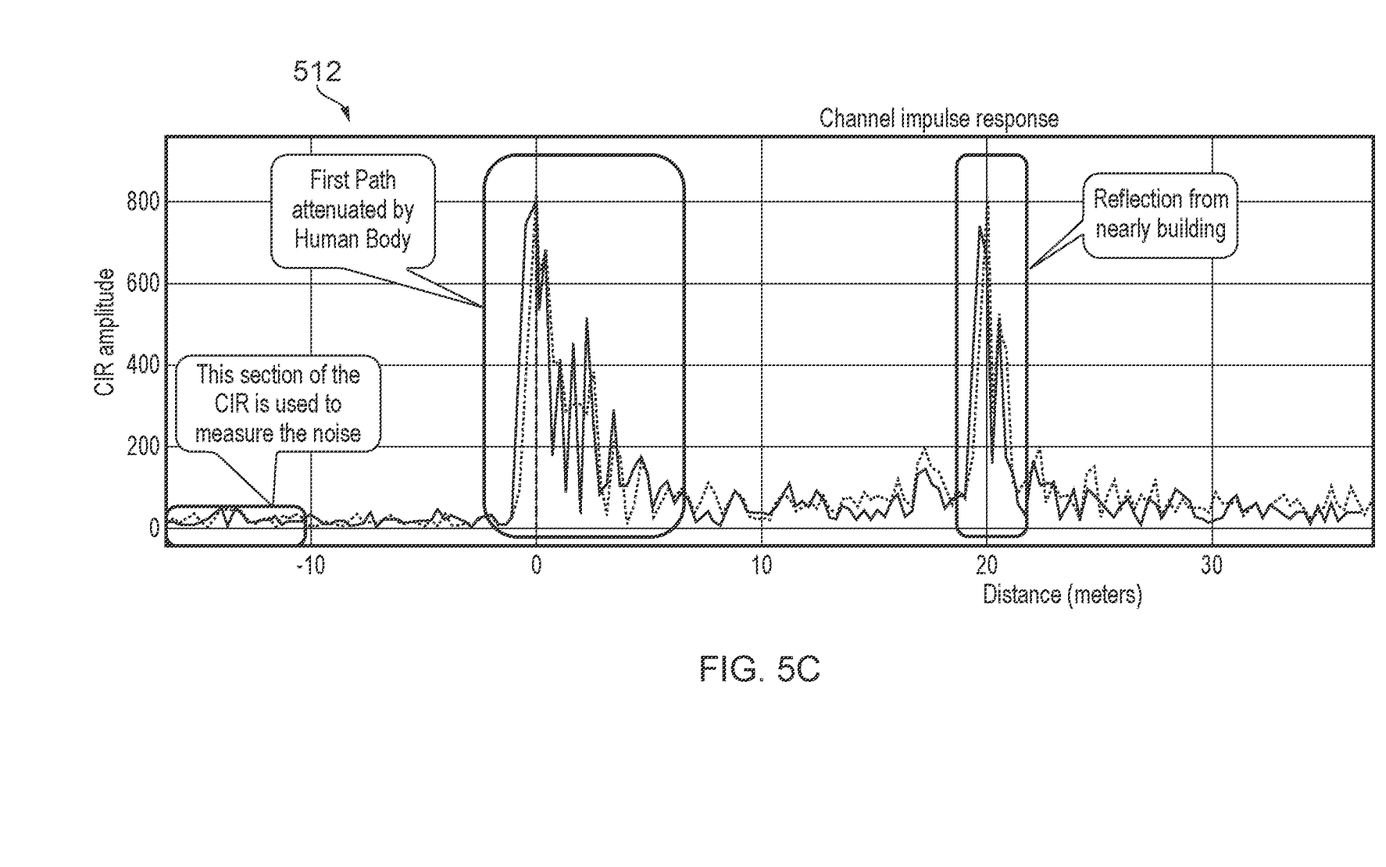
FIG. 5C shows an illustrative embodiment of a channel impulse response in case of attenuation and reflection.

FIG. 5C shows an illustrative embodiment of a channel impulse response 512 in case of attenuation and reflection. In particular, the signal transmitted by the UWB transmitter 506 to the UWB receiver 504 shown in FIG. 5A may be attenuated by the human body 508 and reflected by the wall 510. In FIG. 5B it is shown how this affects the channel impulse response. It is noted that the channel impulse response is generated on the side of the UWB receiver 504. Furthermore, the unit of the X-axis can be time or distance (i.e., time*c).

Figure 6:
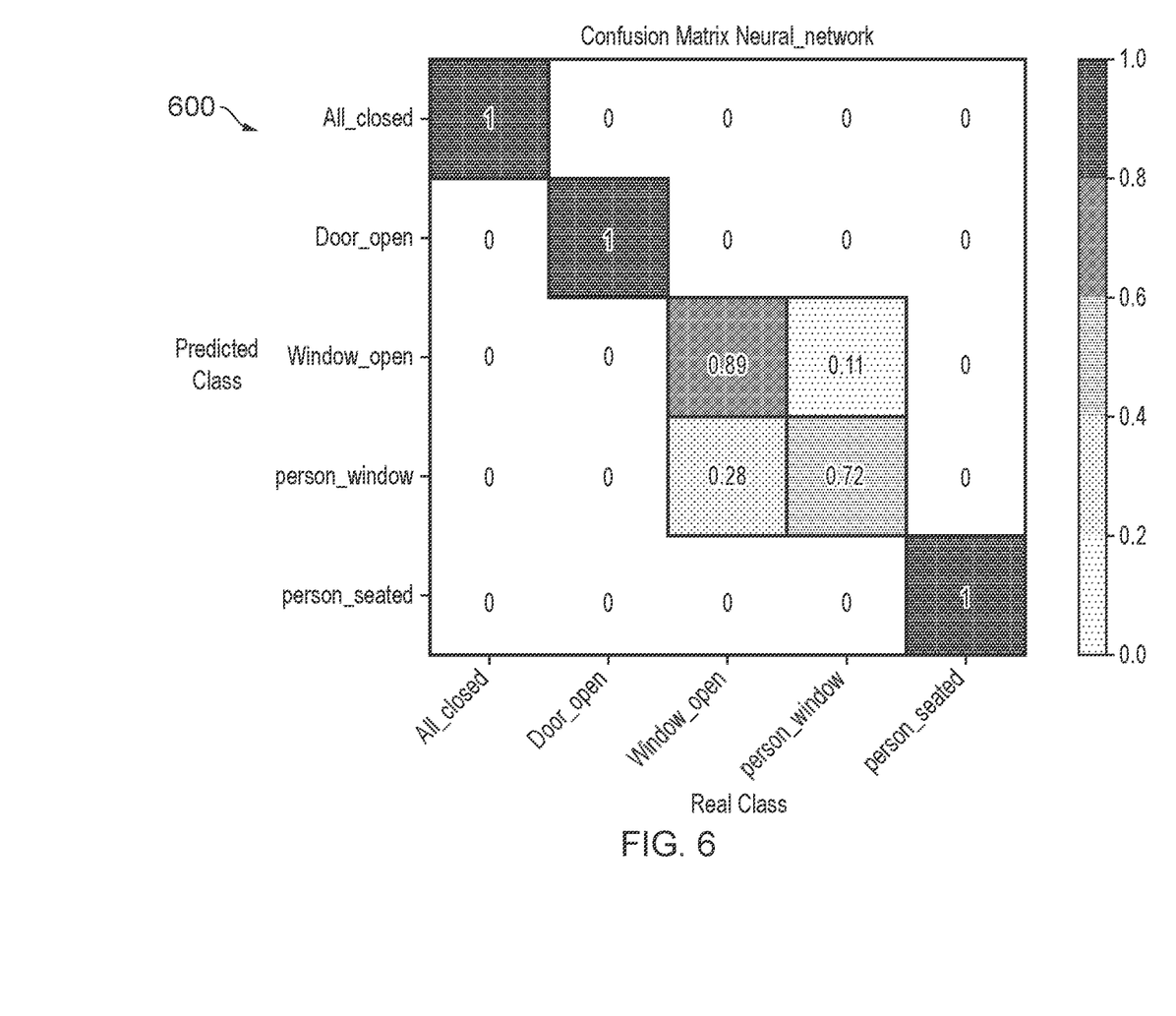
FIG. 6 shows an illustrative embodiment of a confusion matrix for a neural network classifier.

FIG. 6 shows an illustrative embodiment of a confusion matrix 600 for a neural network classifier. As mentioned above, the machine learning algorithm may be a decision tree algorithm, a neural network, a nearest neighbor algorithm, or a support vector machine. In case a neural network is used, the confusion matrix results 600 shown in FIG. 6 may be obtained. It is noted that the machine learning algorithm may be pre-trained, for example once for every vehicle model. It is noted that a confusion matrix is a quality metric of a machine learning algorithm; it shows a predicted class versus a real class. In particular, an algorithm which is completely accurate in the prediction will have ones on the diagonal. In this case, the results may be regarded as satisfactory, because the matrix does not show any false positives (for example, when the doors are closed, no other class is detected). As can be seen, some misclassification may occur in the sense that a person near the window and a window open are sometimes confused. Although this is not completely accurate, it may be reliable enough for detecting intrusions.

It is noted that the presently disclosed system and method can also be used to advantage to protect objects different from vehicles. For example, when UWB is used for building access, then the presently disclosed system and method may also be used to detect intrusion in the building or a predefined space within the building (or to detect that a person without UWB has crossed the door, for example).

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 system for facilitating detecting an unauthorized access to an object
102 controller
104 UWB communication node
106 UWB communication node
108 UWB communication node
110 UWB communication node
200 method for facilitating detecting an unauthorized access to an object
202 Causing, by a controller, at least one of a plurality of UWB communication nodes to transmit one or more UWB messages to other UWB communication nodes of said plurality of UWB communication nodes
204 Receiving, by the controller, a channel impulse response (CIR) estimate and/or one or more parameters relating to said CIR output by the UWB communication nodes in response to receiving said UWB messages
206 Analyzing, by the controller, said CIR estimate and/or said parameters relating to the CIR to detect said unauthorized access to the object
300 vehicle
302 body control module (BCM)
304 UWB anchor
306 UWB anchor
308 UWB anchor
310 UWB anchor
312 UWB anchor
314 network
400 method for facilitating detecting an unauthorized access to an object
402 vehicle closed
404 transmitter selection
406 message exchange between anchors
408 retrieve CIR/features from receiving anchors
410 select machine learning (ML) model
412 perform classification
414 intrusion detected decision
416 trigger other sensors/alarm
418 use first measurements for calibration
500 first path features
502 UWB signal transmission
504 UWB receiver
506 UWB transmitter
508 human body
510 wall
512 channel impulse response
600 confusion matrix for a neural network classifier

What is claimed is:
1. A system for facilitating detecting an unauthorized access to an object, the system comprising:
a plurality of ultra-wideband, UWB, communication nodes;

a controller operatively coupled to said plurality of UWB communication nodes, wherein the controller is configured to:

cause at least one of the UWB communication nodes to transmit one or more UWB messages to other UWB communication nodes of said plurality of UWB communication nodes;

receive a channel impulse response, CIR, estimate and/or one or more parameters relating to said CIR output by the UWB communication nodes in response to receiving said UWB messages;

analyze said CIR estimate and/or said parameters relating to the CIR to detect said unauthorized access to the object;

wherein the controller is configured to cause different UWB communication nodes of said plurality of UWB communication nodes to transmit said UWB messages by periodically changing the UWB communication node or nodes that transmit the messages;

wherein the controller is configured to determine changes of the CIR estimate and/or of the parameters relating to the CIR, and to detect said unauthorized access by comparing the determined changes with predefined values and concluding that unauthorized access has occurred if the determined changes match with said predefined values within a given tolerance range.

2. The system of claim 1, wherein the controller is configured to analyze said CIR estimate and/or said parameters relating to the CIR using a machine learning algorithm.

3. The system of claim 2, wherein the machine learning algorithm is a decision tree algorithm, a neural network, a nearest neighbor algorithm, or a support vector machine.

4. The system of claim 2, wherein the controller is further configured to feed the machine learning algorithm with data indicative of an environment in which the object is located.

5. The system of claim 1, wherein the controller is configured to cause said at least at least one of the UWB communication nodes to transmit said UWB messages after the object has been locked.

6. The system of claim 1, wherein the controller is further configured to execute one or more predefined operations in response to detecting the unauthorized access to the object.

7. The system of claim 6, wherein the predefined operations comprise raising an alarm and/or activating one or more intrusion sensors.

8. The system of claim 1, wherein the parameters relating to the CIR include at least one of the following parameters:
a power level;
a strongest path amplitude ratio;
a strongest path time difference;
a spectral power;
a first path width;
a first path prominence.

9. The system of claim 1, wherein the object is a vehicle, and wherein the UWB communication nodes are UWB anchors comprised in or attached to said vehicle.

10. A method for facilitating detecting an unauthorized access to an object, the method comprising:
causing, by a controller, at least one of a plurality of UWB communication nodes to transmit one or more UWB messages to other UWB communication nodes of said plurality of UWB communication nodes;

receiving, by the controller, a channel impulse response, CIR, estimate and/or one or more parameters relating to said CIR output by the UWB communication nodes in response to receiving said UWB messages;

analyzing, by the controller, said CIR estimate and/or said parameters relating to the CIR to detect said unauthorized access to the object;

wherein the controller causes different UWB communication nodes of said plurality of UWB communication nodes to transmit said UWB messages by periodically changing the UWB communication node or nodes that transmit the messages;

wherein the controller determines changes of the CIR estimate and/or of the parameters relating to the CIR, and detects said unauthorized access by comparing the determined changes with predefined values and concluding that unauthorized access has occurred if the determined changes match with said predefined values within a given tolerance range.

11. A computer program comprising executable instructions which, when executed by a controller, cause said controller to carry out the method of claim 10.

* * * * *